United States Patent [19]

Harwood et al.

[11] 4,249,199
[45] Feb. 3, 1981

[54] PHASE COMPENSATED CONTROLLED OSCILLATOR

[75] Inventors: Leopold A. Harwood, Bridgewater; Erwin J. Wittmann, North Plainfield, both of N.J.

[73] Assignee: RCA Corporation, New York, N.Y.

[21] Appl. No.: 82,469

[22] Filed: Oct. 9, 1979

[51] Int. Cl.³ .......................... H04N 9/46; H03B 5/00
[52] U.S. Cl. .......................................... 358/19; 331/8; 358/25
[58] Field of Search ............................ 358/17, 18, 25; 331/1 R, 8, 17, 19, 20, 25

[56] References Cited
U.S. PATENT DOCUMENTS

| | | | |
|---|---|---|---|
| 3,973,221 | 8/1976 | Jett | 358/25 |
| 4,020,500 | 4/1977 | Harwood | 358/19 |
| 4,095,255 | 6/1978 | Groenweg | 358/17 |

Primary Examiner—Robert L. Griffin
Assistant Examiner—Michael Allen Masinick
Attorney, Agent, or Firm—Eugene M. Whitacre; William H. Meagher; Ronald H. Kurdyla

[57] ABSTRACT

A controlled oscillator comprises an amplifier including an active device, a filter network arranged in a feedback loop of the amplifier for providing regenerative feedback to sustain oscillation of the amplifier, and a source of control signals. Output oscillatory signals from the amplifier and output control signals from the control source are summed by a combining network to produce a resultant controlled signal, which is coupled to the filter network. Parasitic capacitances associated with output terminals of the amplifier and control source impart an unwanted phase shift to the controlled signal. A compensation signal derived from the oscillator is supplied to the combining network with a magnitude and phase to offset the unwanted phase shift, to thereby produce a phase compensated resultant controlled signal.

8 Claims, 4 Drawing Figures

PHASE COMPENSATED CONTROLLED OSCILLATOR

This invention relates to a controlled oscillator compensated to virtually eliminate unwanted signal phase shift attributable to parasitic capacitance.

In many types of apparatus, there is a requirement for an oscillator having predictable phase and frequency operating characteristics including a symmetrical range of phase and frequency control. These characteristics are especially desirable for a controlled oscillator employed in a chrominance channel of a color television receiver for providing a reference signal for demodulating chrominance signal information, for example. Such an oscillator typically is controlled in response to a voltage proportional to a phase or frequency difference between a locally generated oscillator reference signal and a burst signal component of the chrominance signal. One example of such a controlled oscillator is described in U.S. Pat. No. 4,020,500 entitled "Controlled Oscillator".

An oscillator commonly employs a resonant circuit (e.g., including a crystal filter) in a feedback loop of the oscillator for determining a desired frequency of operation. Tuning of the resonant circuit to establish a precise operating frequency often is accomplished by means of a small, variable tuning capacitance associated with the resonant circuit. Parasitic capacitance associated with the oscillator can impair the operation of the oscillator by introducing unwanted signal phase shift. Such phase shift can upset the tuning of the resonant circuit and the pull-in range of the oscillator, and limit the range of tuning which can be provided by the variable tuning capacitance. In a voltage controlled oscillator, an unsymmetrical range of control can also result.

The parasitic capacitance can be associated with circuits coupled to the resonant circuit. For example, in an oscillator including a resonant circuit arranged in feedback relation with an amplifier, the parasitic capacitance can be associated with an output of the amplifier coupled to the resonant circuit. In the case of a controlled oscillator, such capacitance also can be associated with a control circuit also coupled to the resonant circuit.

One approach for reducing the adverse effects of such parasitic capacitance upon the operation of an oscillator is described in U.S. Pat. No. 4,095,255 entitled "Controlled Oscillator With Increased Immunity To Parasitic Capacitance."

In accordance with the principles of the present invention, there is described herein a controlled oscillator compensated for the effects of the described parasitic capacitance. Specifically, the disclosed oscillator is arranged such that unwanted signal phase shift attributable to the parasitic capacitance is virtually eliminated.

In accordance with the present invention, a controlled oscillator comprises an amplifier including an active device having an output terminal, a filter network arranged in a feedback loop of the amplifier for providing regenerative feedback of sufficient magnitude to produce an oscillatory signal at the output terminal of the active device, a control network providing a control signal at an output terminal, a network for combining the oscillatory signal and the control signal to produce a combined signal at an output of the combining network, and means for coupling output signals from the combining network to the filter. The output terminal of the active device and the output terminal of the control network each have a parasitic capacitance associated therewith, whereby the combined signal is susceptible of an undesired phase shift attributable to the parasitic capacitances. The oscillator also includes an arrangement for providing an auxiliary signal of predetermined magnitude and phase at the frequency of signals filtered by the filter network. The auxiliary signal is coupled to the combining network to form a resultant signal with the oscillatory signal and the control signal at an output of the combining network. The magnitude and phase of the auxiliary signal are determined relative to the magnitude and phase of the combined signal such that the undesired phase shift is substantially cancelled in the resultant signal.

Figure 1:
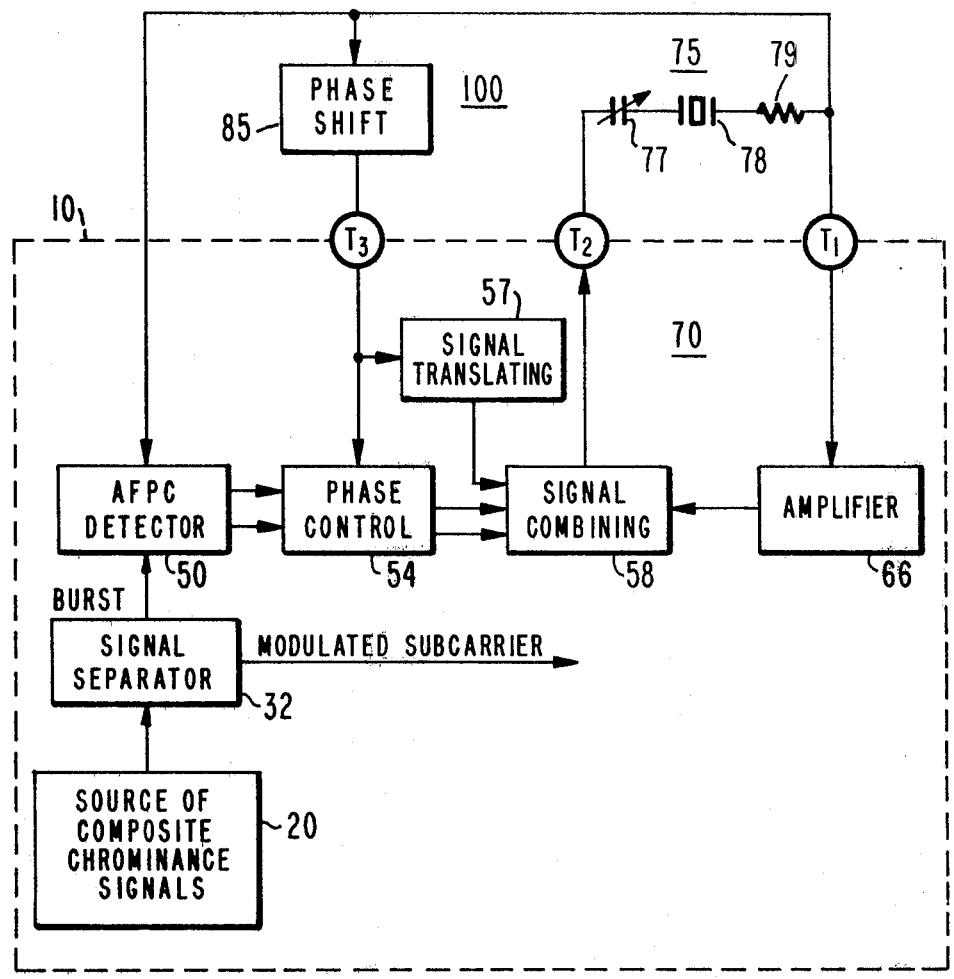
FIG. 1 is a diagram in block form of a portion of a chrominance signal processing channel of a color television receiver including a controlled color oscillator arranged according to the principles of the present invention.

Referring to FIG. 1, it is noted that the blocks within a dashed outline 10 represent signal processing functions which are capable of being included on a single, monolithic integrated circuit. In such case, terminals $T_1$, $T_2$ and $T_3$ represent external connecting terminals to the integrated circuit. A source of composite chrominance signal 20 supplies R-Y, G-Y and B-Y color difference signal information imposed as amplitude modulation at selected phases of a suppressed color subcarrier wave, and a color burst component of the composite signal. According to United States broadcast standards, color burst signal information is transmitted during a relatively short synchronizing interval following the end of each horizontal image scanning line. The color burst typically consists of several cycles of an unmodulated waveform having a frequency equal to that of a reference color subcarrier signal.

The burst and modulated subcarrier components of the composite chrominance signal are separated by a signal separator 32 (e.g., a keyed amplifier). The separated modulated subcarrier component is coupled to succeeding chrominance processing circuits (e.g., including tint control, automatic color control, matrix and demodulator circuits) for ultimately deriving color image representative R, B and G signals in known fashion. The R, B and G signals are applied in a known manner to an image reproducing kinescope of the receiver (not shown).

Separated burst signals from signal separator 32 are supplied to an automatic frequency and phase control (AFPC) detector 50. Detector 50 is also supplied with an oscillatory reference signal from a voltage controlled color oscillator 100 including a phase control stage 54, an oscillator 70 and a phase shift network 85. Oscillator 70 comprises an amplifier 66 and a feedback path including a signal combining network 58 and a resonant circuit 75. As will be discussed in greater detail, network 58 combines signal outputs from oscillator amplifier 66 and from control unit 54, with a predetermined portion of the phase shifted input signal to control unit 54, as supplied to network 58 via a signal translating and proportioning network 57. Controlled oscillator 100 is described in detail in aforementioned U.S. Pat. No. 4,020,500, and detector 50 may, for example, be of the type described in U.S. Pat. No. 3,740,456. Detector 50 provides output control signals representative of the phase and/or frequency relationship between the transmitted burst component and a reference signal produced by controlled oscillator 100. Filtered output signals from AFPC detector 50 are applied to phase control stage 54 of controlled oscillator 100, the operation of which will be discussed in connection with FIG. 2.

Figure 2:
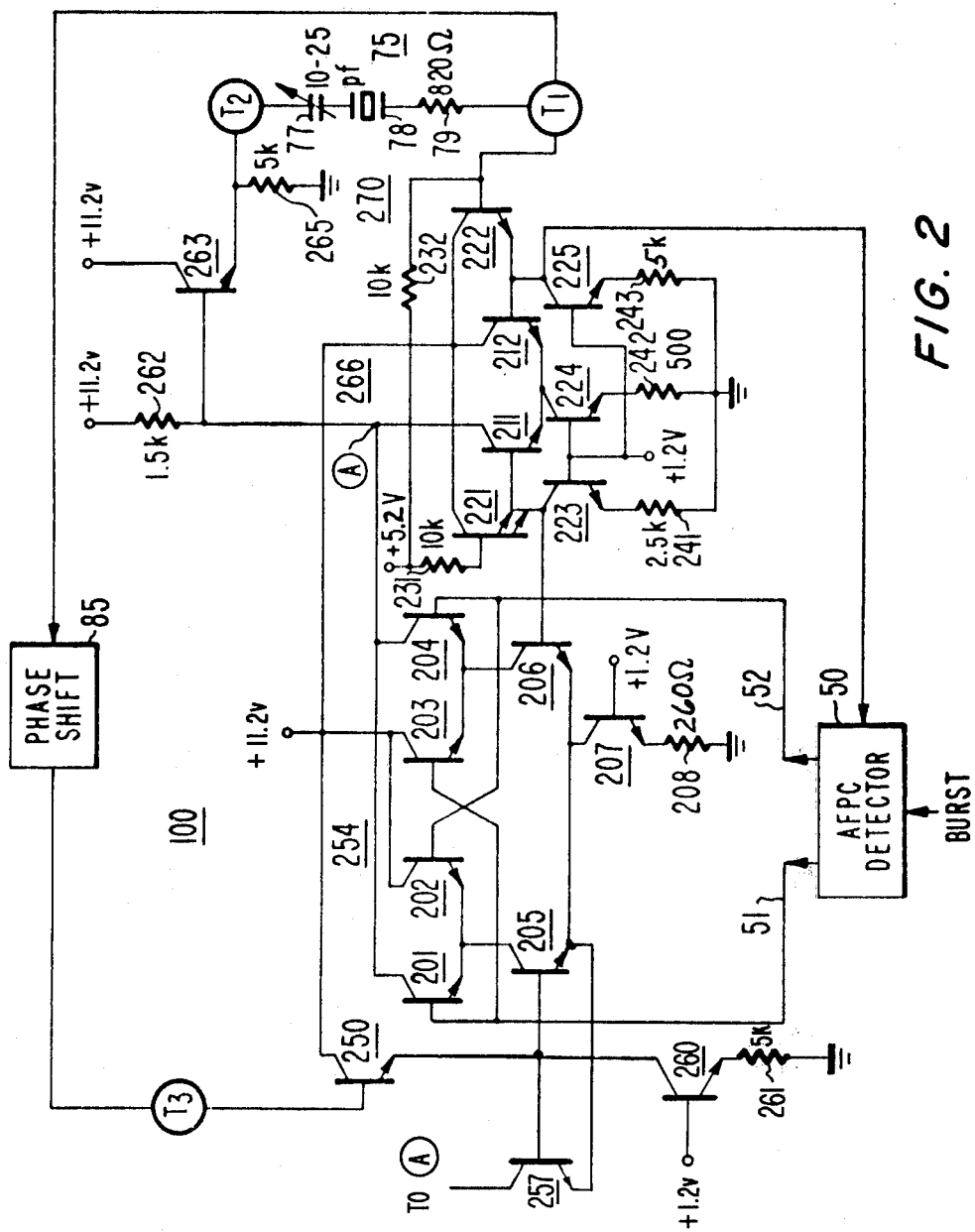
FIG. 2 is a diagram partially in block form and partially in schematic circuit diagram form of a portion of the chrominance channel shown in FIG. 1 including a controlled color oscillator and an associated phase compensation circuit according to the present invention.

Referring now to FIG. 2, controlled oscillator 100 is shown as including a closed loop oscillator circuit 270 and a separate phase control stage 254.

Oscillator 270 produces a continuous wave signal at the nominal chrominance subcarrier frequency (e.g., about 3.58 MHz according to United States television standards). Oscillator 270 comprises an amplifier 266 formed by emitter coupled transistors 211 and 212 which are arranged to amplify and limit signals in the oscillator loop, and a frequency determining resonant circuit 75 including a narrow band crystal filter 78, an adjustable tuning capacitor 77 and a resistor 79 arranged in series between terminals $T_2$ and $T_1$. Crystal 78 has a resonant frequency about the chrominance subcarrier frequency, the resonant frequency being more precisely determined by adjusting variable capacitor 77. Resistor 79 is dimensioned to provide a bandwidth for resonant circuit 75 of the order of 1000 Hz, centered about the nominal 3.58 MHz oscillator frequency, at the $-3$ db point. The 1000 Hz bandwidth contributes to a pull-in range of about $\pm 500$ Hz for oscillator 270. Output signals from amplifier 266 appear at a collector of transistor 211 at a circuit point A, and are coupled to terminal $T_2$ via a load resistor 262 and an emitter follower buffer transistor 263. A terminating resistor 265 couples an emitter of transistor 263 to ground.

A current source transistor 224 is coupled from interconnected emitters of transistors 211 and 212 to a point of reference potential (ground) via a bias resistor 242. Operating bias for amplifier transistors 211, 212 is provided by a dual-emitter bias transistor 221, transistors 222-225, and resistors 241-243 arranged as shown.

Signals appearing at terminal $T_1$, hereinafter called "in-phase" signals, are phase shifted by phase shift network 85 (e.g., an inductance-capacitance network). In this example, output signals from network 85 exhibit a lagging phase shift of about ninety degrees at resonance (e.g., 3.58 MHz) compared to the in-phase signals. The signals from network 85, hereinafter referred to as "quadrature" signals, are coupled to control stage 254 of controlled oscillator 100 via terminal $T_3$ and an emitter follower buffer transistor 250. The quadrature signals also can be coupled to tint control and automatic color control (ACC) circuits included in additional chrominance signal processing circuits (not shown), and the in-phase signals also can be coupled to the tint control circuit, as described in aforementioned U.S. Pat. No. 4,020,500.

Control stage 254 comprises a balanced amplifier with first and second similar pairs of differentially connected transistors 201, 202 and 203, 204 arranged as shown and responsive to control signals supplied from AFPC detector 50, and a third pair of differentially connected transistors 205, 206, also arranged as shown and supplied with quadrature signals via transistor 250. Base input electrodes of transistors 201 and 203 are connected in common to one control signal output of AFPC detector 50 via a line 51, and the base input electrodes of transistors 202 and 204 are connected to another output of AFPC detector 50 via a line 52. A trnasistor 207 and an associated resistor 208 provide operating currents for stage 254. Operating currents for transistor 250 are provided by a network comprising a transistor 260 and resistor 261.

In a normal operating mode for proper demodulation of the received chrominance signal, it is desired that the nominally in-phase signals at terminal $T_1$ have a frequency equal to that of the received burst component and be in quadrature phase (ninety degrees) relationship therewith. The desired signal relationship is provided by control stage 254 in cooperation with oscillator 270 as described in U.S. Pat. No. 4,020,500. Briefly, the in-phase oscillatory signals of oscillator 270 appear at the collector of transistor 211 and circuit point A, and are developed across resistor 262. This signal is coupled via transistor 263, resonant circuit 75, follower transistor 22 and transistor 212 to complete the feedback loop of oscillator 270. Control stage 254 produces equal but oppositely phased quadrature output signals at respective collectors of transistors 201 and 204. AFPC detector 50 is supplied with burst signals and with in-phase signals from oscillator 270 via an emitter of follower transistor 222, to produce differential control signals on lines 51 and 52 representative of the phase and/or frequency difference between the in-phase and burst signals. The quadrature output signals of stage 254 are controlled in magnitude by varying the conduction of transistors 201-204 as a function of the magnitude of the control signals from AFPC detector 50.

When the in-phase oscillator reference signal and the burst signal are in proper phase and frequency relationship (i.e., same frequency and ninety degrees phase relationship), AFPC detector 50 produces control signals of equal magnitude on each output line. Transistors 201 and 204 therefore each conduct signal currents of equal magnitude but opposite phase, corresponding to the quadrature signal supplied from transistors 205 and 206, which cancel when combined at point A. When the oscillator and burst signals deviate from the desired relationship, AFPC detector 50 develops output control signals which are unequal in magnitude. Transistors 201 and 204 then conduct unequal amounts of quadrature signal currents to produce a resultant quadrature signal component at point A with a magnitude and phase determined by the relative magnitude and phase of control signals provided by AFPC detector 50. In this manner, versions of the quadrature signal are developed at point A of a magnitude and phase in accordance with the magnitude and phase of control signals applied to the base electrodes of transistors 201, 202 and 203, 204 from AFPC detector 50.

A signal thus appearing at point A is a resultant (vector sum) of quadrature signals from the collectors of transistors 201, 204 of phase control stage 254, in-phase signals from the collector of transistor 211 of oscillator stage 270, and an auxiliary quadrature phase compensation signal as will be discussed. This resultant signal exhibits a phase between the phases of the in-phase and quadrature signals. The resultant signal appears across load resistor 262 and is coupled by transistor 263 to resonant circuit 75 to adjust the operating frequency and phase of oscillator 270. The adjustment of the operating frequency is a function of the bandwidth of resonant circuit 75 and the amount of phase shift introduced into the oscillator feedback loop as determined by the resultant signal. In this example, the resultant signal can exhibit a phase within a range of about ninety degrees (i.e., ±45 degrees) as determined by the magnitude and polarity of the quadrature signal from control stage 254, and by the gain of oscillator amplifier 266.

The operating frequency of oscillator 270 remains unchanged in the absence of quadrature signals supplied from control stage 254, when the signal frequency of oscillator 270 and the burst signal frequency are substantially equal. The signal developed across resistor 262 and supplied to resonant circuit 75 therefore corresponds to the oscillator reference signal at the nominal zero degrees reference phase. Positive or negative deviations from the desired frequency relationship result in corresponding positive or negative amounts of quadrature signal being supplied from control stage 254, to form the resultant signal with a phase angle representative of the frequency deviation when the quadrature and in-phase signals are combined at point A. The operating frequency of oscillator 270 is altered to correspond to the frequency of the burst signal, and the net phase shift around the feedback loop of oscillator 270 remains zero for sustaining oscillation.

It is noted that each of the output collector electrodes of transistors 201 and 204 of control stage 254 has associated therewith a parasitic capacitance (i.e., collector-base and collector-substrate capacitance) of approximately two picofarads, for example. A similar parasitic capacitance also appears at the collector output of transistor 211 of oscillator 270. The magnitudes of these capacitances are predictable on a unit-to-unit basis when control stage 254 and amplifier 266 are fabricated in an integrated circuit. The total of these parasitic capacitances presents an impedance to the signals developed at point A such that the total capacitance can contribute to the production of an undesired signal phase delay with respect to the resultant signal produced at point A. For example, for a given magnitude and polarity of quadrature signals from stage 254, such phase shift can cause the phase of the resultant signal at point A to be offset from an expected phase. Unsymmetrical control of oscillator stage 270 therefore results.

More specifically, in this example crystal 78 operates between series and parallel resonant modes. Oscillator 270 ideally will operate at the series resonant frequency of network 75. Tuning capacitor 77 is adjusted to establish the design operating frequency about which oscillator 270 exhibits a desired frequency pull-in range. The parallel and series mode frequencies define an operating frequency range within a portion of which crystal 78 can be tuned by capacitor 77, and within a portion of which variations of oscillation signal phase produce corresponding variations of oscillation signal frequency, as is known. The pull-in range of oscillator 270 encompasses a predetermined segment of the aforementioned operation range, and the oscillatory operation and pull-in capability of oscillator 270 diminishes as parallel resonant operation (+90 degrees deviation from a nominal zero degrees reference phase) is approached.

The undesired phase shift introduced by the parasitic capacitances serves to shift the "phase axis" about which phases of the resultant signal are developed (e.g. ±45 degrees about a nominal zero degree phase axis).

For example, the undesired phase shift can cause the phase axis to shift toward the phase (e.g., +90 degrees) associated with the parallel resonant mode. On extreme of the phase range of the resultant signal will then approach more closely (or exceed) the phase associated with the parallel resonant mode. A resultant signal with a phase at or near such extreme may be beyond the pull-in capability of oscillator 270. That is, the phase of the resultant signal may not have the desired effect of producing a corresponding change in the operating frequency of oscillator 270, in accordance with the phase-versus-frequency response of crystal 78. An unsymmetrical pull-in range with attendant unsymmetrical control of oscillator 270 therefore results.

The undesired signal phase shift is eliminated by means of a phase compensation network comprising a transistor 257. Transistor 257 serves to couple a given portion of the quadrature signal from the emitter transistor 250 to signal combining point A, with a sense to cancel the undesired phase delay otherwise produced by the parasitic capacitance, as follows.

A base input electrode of transistor 257 receives quadrature phase signals from the emitter of transistor 250, and is also directly connected to a base electrode of transistor 205. An emitter electrode of transistor 257 is directly connected to the joined emitter electodes of transistors 205 and 206, whereby the base-emitter junctions of transistors 257 and 205 are directly connected in parallel and poled for current conduction in the same direction. Transistors 205, 206 and 257 are planar bipolar types in this embodiment. An inverted version of the quadrature signal from transistor 250 appears at a collector output of transistor 257.

The magnitude of the collector current of transistor 257 and thereby the magnitude of the inverted, quadrature signal developed at the collector of transistor 257 is a function of the emitter junction area geometry of transistor 257. In this example, the emitter area of transistor 257 exhibits a predetermined relationship with the emitter areas of quadrature signal amplifier transistors 205 and 206. The relative magnitudes of collector output signal currents conducted by transistors 205, 206 and 257 therefore exhibit a corresponding predetermined relationship. More specifically, in this case the emitter area of transistor 257 is substantially 0.4 square mills, and the emitter areas of transistors 205 and 206 are each substantially 0.75 square mills. With this emitter area relationship, operating currents from current source transistor 207 divides so that approximately twenty-one percent (0.4/1.9×100) of the current supplied by transistor 207 flows as emitter current in transistor 257, while the remaining current available from transistor 207 divides equally between transistors 205 and 206. The magnitude of the quadrature signal developed at the collector of transistor 257 therefore is twenty-one percent of the combined magnitudes of the quadrature signals developed at the collectors of transistors 205 and 206. The described ratio of collector current conduction of transistors 205, 206 and 257 can be accurately determined when these transistors are fabricated in the same integrated circuit, as in this example.

The described magnitude of the inverted, quadrature phase signal developed at the collector of transistor 257 is appropriate in this example to virtually eliminate the unwanted signal phase delay attributable to the parasitic capacitive, when the signal from transistor 257 is applied to point A. This result is produced by imparting a phase advance, in an amount equal to the parasitic phase delay, to the signal otherwise appearing at point A by means of vector summation. The manner by which this is accomplished is shown by the vector diagram of FIG. 3.

Figure 3:
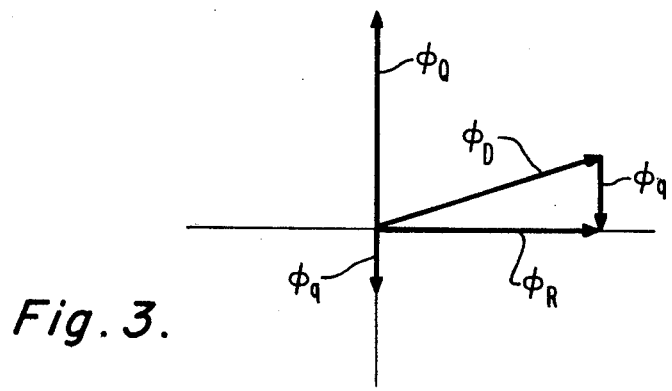
FIG. 3 depicts a vector diagram useful in understanding the operation of the compensation circuit according to the invention.

In FIG. 3, $\phi_Q$ represents the quadrature signal developed by phase shift network 85, which exhibits a lagging phase shift of ninety degrees relative to the "in-phase" signal from amplifier 266. A signal $\phi_q$ represents an inverted portion of the quadrature signal as developed at the collector output of transistor 257. A signal $\phi_D$ represents the undesired phase delayed resultant signal otherwise produced at point A in the absence of the phase compensation network including transistor 257. A phase compensated resultant signal $\phi_R$ of the desired phase is produced at point A by vector summation of signal $\phi_q$ with signal $\phi_D$.

Figure 4:
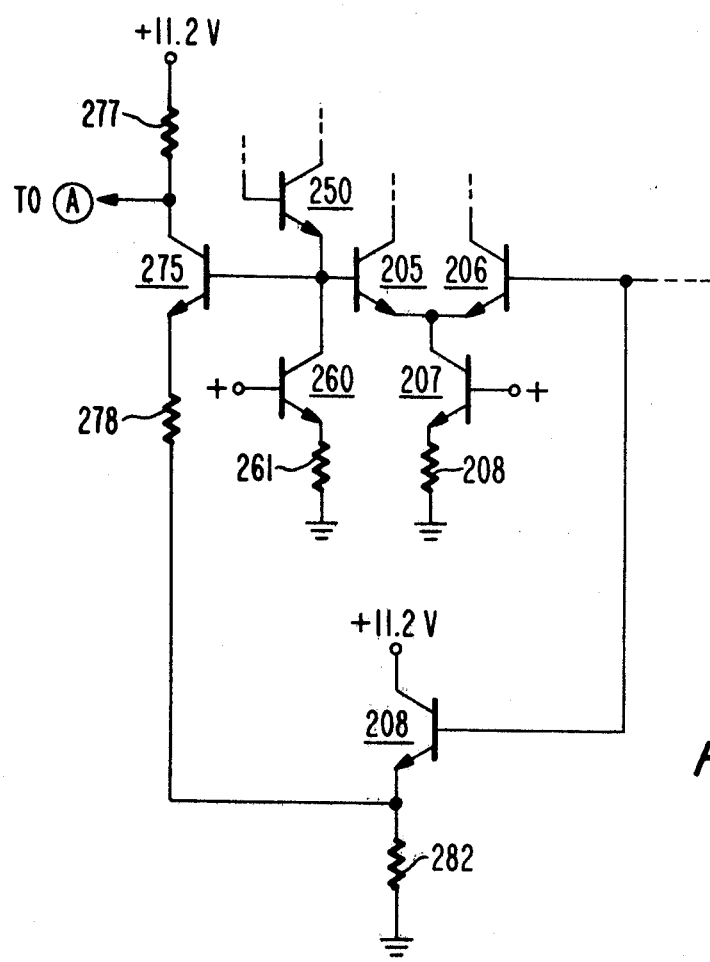
FIG. 4 illustrates an alternative embodiment of the phase compensation circuit shown in FIG. 2.

FIG. 4 illustrates an alternative arrangement of the phase compensation network of FIG. 2. The arrangement of FIG. 4 differs from that of FIG. 2 in that transistor 257 of FIG. 2 has been replaced by a circuit including transistors 275, 280 and resistors 277, 278, 282 in FIG. 4. In this embodiment, a phase compensation signal of appropriate magnitude (i.e., an inverted version of the quadrature signal) is developed at a collector output of transistor 275 by appropriately tailoring the circuit bias and the values of collector and emitter resistors 277 and 278. Transistor 280 and resistor 282 provide bias for the emitter circuit of transistor 275.

The described phase compensation arrangements serve to optimize the operation of controlled oscillator 100 by eliminating the signal phase shift caused by the parasitic capacitance, in the manner discussed. Tuning of oscillator stage 270 at a desired center operating frequency is facilitated, and a desired pull-in range about the operating frequency results. A more symmetrical range of phase and frequency control also results.

What is claimed is:

1. In a controlled oscillator comprising: amplifier means including an active device having an output terminal, said output terminal having a parasitic capacitance associated therewith; filter means arranged in a feedback loop of said amplifier means for providing regenerative feedback of sufficient magnitude to produce an oscillatory signal at said output terminal of said active device; control means providing a control signal at an output terminal, said output terminal having a parasitic capacitance associated therewith; combining means for combining said oscillatory signal and said control signal to produce a combined signal at an output of said combining means, said combined signal being susceptible of an undesired phase shift attributable to said parasitic capacitances; and means for coupling output signals from said combining means to said filter; an arrangement comprising:
   means for providing an auxiliary signal of predetermined magnitude and phase at the frequency of signals filtered by said filter means;
   means for coupling said auxiliary signal to said combining means to form a resultant signal with said oscillatory signal and said control signal at an output of said combining means; and wherein
   said predetermined magnitude and phase of said auxiliary signal is determined relative to the magnitude and phase of said combined signal such that said undesired phase shift is substantially cancelled in said resultant signal.

2. An arrangement according to claim 1, wherein:
   said auxiliary signal is derived from signals filtered by said filter means.

3. An arrangement according to claim 1, wherein:
   said control signal and said auxiliary signal are derived from signals filtered by said filter means.

4. An arrangement according to claim 1 and further comprising:
   phase shift means for imparting a given phase shift to signals filtered by said filter means; and wherein
   said control signal and said auxiliary signal are derived from phase shifted signals from said phase shift means.

5. An arrangement according to claim 1, wherein:
   said active device of said amplifier means comprises a first transistor, and said output terminal of said amplifier means corresponds to a collector electrode of said first transistor; and
   said control means comprises a second transistor, and said output terminal of said control means corresponds to a collector electrode of said second transistor.

6. An arrangement according to claim 1, wherein:
   said oscillator includes means for providing an alternating current signal with a phase different from a phase of said oscillatory signal;
   said control means comprises:
      first and second transistors responsive to said alternating current signal, each transistor having a base electrode, an emitter electrode, and a collector output electrode with an associated parasitic capacitance, and
      means for controlling the conduction of said first and second transistors in complementary fashion;
   said active device of said amplifier means comprises a third transistor having a collector output electrode with an associated parasitic capacitance; and wherein
   said combining means combines signals from said collector output electrodes of said first, second and third transistors.

7. An arrangement according to claim 6, and further comprising:
   fourth and fifth transistors responsive to said alternating current signal, for supplying operating currents to said first and second transistors;
   a sixth transistor responsive to said alternating current signal, for providing an alternating current signal corresponding to said auxiliary signal at an output electrode; and wherein
   the current conduction characteristic of said sixth transistor is proportioned relative to the current conduction characteristics of said fourth and fifth transistors such that said alternating current auxiliary signal conducted by said sixth transistor is in predetermined proportion to alternating current signals conducted by said fourth and fifth transistors.

8. In a color television receiver for processing a color television signal including a chrominance information component and a color synchronizing burst component having a prescribed phase and frequency, a controlled oscillator including amplifier means including an active device having an output terminal, said output terminal having a parasitic capacitance associated therewith; filter means arranged in a feedback loop of said amplifier means for providing regenerative feedback of sufficient magnitude to produce an oscillatory signal at said output terminal of said active device, said filter means having a frequency response characteristic centered relatively about said frequency of said burst component for producing said oscillatory signal with a frequency substantially equal to said burst component frequency; control means providing a control signal representative of the frequency and/or phase of said oscillatory signal relative to said burst component at an output terminal, said output terminal having a parasitic capacitance associated therewith; combining means for combining said oscillatory signal and said control signal to produce a combined signal at an output of said combining means, said combined signal being susceptible of an undesired phase shift attributable to said parasitic capaticances; and means for couplings output signals from said combining means to said filter means; said oscillator further comprising:

means for providing an auxiliary signal of predetermined magnitude and phase at the frequency of signals filtered by said filter means;

means for coupling said auxiliary signal to said combining means to form a resultant signal with said oscillatory signal and said control signal at an output of said combining means; and wherein said predetermined magnitude and phase of said auxiliary signal is determined relative to the magnitude and phase of said combined signal such that said undesired phase shift is substantially cancelled in said resultant signal.

* * * * *